United States Patent
Montagnino et al.

(10) Patent No.: US 6,759,605 B2
(45) Date of Patent: Jul. 6, 2004

(54) SCALE WITH STRUCTURAL MAT

(75) Inventors: James G. Montagnino, St. Charles, IL (US); Anson Wong, Boca Raton, FL (US); Ricardo Murguia, Berwyn, IL (US)

(73) Assignee: Sunbeam Products, Inc., Boca Raton, FL (US)

( * ) Notice: Subject to any disclaimer, the term of this patent is extended or adjusted under 35 U.S.C. 154(b) by 214 days.

(21) Appl. No.: 10/072,218

(22) Filed: Feb. 8, 2002

(65) Prior Publication Data

US 2003/0150653 A1 Aug. 14, 2003

(51) Int. Cl.$^7$ .............................................. G01G 21/28
(52) U.S. Cl. ........................ 177/238; 177/262; 403/24; 428/292.1
(58) Field of Search ................................ 177/180, 238, 177/262; 428/292.1, 297.4; 403/24, 25

(56) References Cited

U.S. PATENT DOCUMENTS

| | | | |
|---|---|---|---|
| D91,151 S | 12/1933 | Van Doren | D10/92 |
| 2,098,845 A | 6/1937 | Weber et al. | 177/230 |
| 2,147,936 A | 8/1939 | Sutton | 177/181 |
| 2,310,560 A | 9/1943 | Weber et al. | 177/181 |
| D137,990 S | 5/1944 | Sundberg | D10/92 |
| D193,024 S | 6/1962 | Rockford | D10/92 |
| 3,187,826 A | 6/1965 | Traff | 177/142 |
| 3,243,002 A | 3/1966 | Reibold | 177/180 |
| 3,640,459 A * | 2/1972 | Preisler | 238/14 |
| 3,703,935 A | 11/1972 | Hutchinson et al. | 177/124 |
| 3,811,523 A | 5/1974 | Artwick et al. | 177/180 |
| 3,861,592 A * | 1/1975 | Fisher | 238/14 |
| 3,882,078 A * | 5/1975 | Kubota | 523/522 |
| 3,953,632 A * | 4/1976 | Robinson | 428/297.4 |
| 3,991,006 A * | 11/1976 | Chandler | 524/425 |
| 4,174,559 A * | 11/1979 | Persik et al. | 403/274 |
| 4,893,685 A * | 1/1990 | Bergman et al. | 177/238 |
| D317,578 S | 6/1991 | Joss et al. | D10/92 |
| 5,131,783 A * | 7/1992 | Astl | 403/298 |
| 5,332,347 A * | 7/1994 | Kimisawa | 411/182 |
| 5,434,367 A * | 7/1995 | Salini | 177/262 |
| D377,617 S | 1/1997 | Gerstner et al. | D10/92 |
| 5,801,338 A * | 9/1998 | Williamson | 177/256 |
| 6,534,729 B1 * | 3/2003 | Stephens | 177/262 |

* cited by examiner

Primary Examiner—Randy Gibson
(74) Attorney, Agent, or Firm—Lawrence J Shurupoff

(57) ABSTRACT

A platform scale cover is reinforced with one or more scale mats formed of a fiber filled polyester thermoset plastic material (FFP). The mats can be securely and rigidly fixed to scale covers using conventional mechanical fasteners. The FFP can be molded with textures, colors and grain patterns which closely simulate natural materials such as marble, granite and other stone and brick type materials. Sturdy mountings can be molded on the mats to facilitate mounting the mat to a scale platform.

14 Claims, 2 Drawing Sheets

SCALE WITH STRUCTURAL MAT

REFERENCE TO RELATED APPLICATIONS

This application is related to copending patent application Ser. No. 10/008,346, filed Nov. 9, 2001, entitled Body Weight Scale with Structural Pod Design and assigned to the same assignee as the present application.

BACKGROUND OF THE INVENTION

1. Field of the Invention

The present invention relates in general to household or "bathroom" scales and in particular to such scales which include a rigid, decorative foot mat that strengthens the upper housing of a scale.

2. Description of Prior Developments

Scales of the type known as household or "bathroom" scales typically include a lower housing or base and an upper housing or cover. These components are typically formed of stamped sheet metal and interconnected by coil springs. In order to provide an economical assembly, the sheet metal used to form the base and cover is typically constructed of relatively thin gauge material.

As a result, the cover is frequently reinforced with one or more panels or braces which underlie, support and rigidify the cover. While this approach proves satisfactory from a structural standpoint, it complicates the assembly of the cover and adds to its cost. Accordingly, a need exists for a strong, rigid scale cover which has a relatively simple construction, yet can be fabricated from a relatively thin gauge sheet metal.

Another issue associated with bathroom scale designs is the need to provide an exterior platform surface for securely supporting a user's feet during weighing. These surfaces are typically covered with a rubber or vinyl pad or mat to reduce slipping. The mats are generally glued to the underlying sheet metal platform with an adhesive.

Unfortunately, the adhesive often fails to hold the corners and edges of the mats in place and, over time, results in an unsightly scale platform having a mat with loose curled edges. Accordingly, a need exists for a covering for the platform of a bathroom scale which is permanently attached to the scale platform so as to eliminate the occurrence of loose curled edges, and avoid the use of adhesives.

Another issue associated with scale mats is their appearance. Attempts have been made to enhance the appearance of bathroom or household scales by applying secondary finishes to the scales in order to simulate natural materials such as stone, granite, marble, jade, etc. These finishes increase the cost of the scale and can be difficult to apply correctly.

Mounting of slabs, mats, or panels of natural material on the scale platforms incurs significant material cost. Additional costs are incurred in the labor required to fabricate and attach the mats to the scale platforms.

Accordingly, a further need exists for a bathroom or household scale which has an exterior surface that can realistically and economically simulate natural materials of the type noted above. A further need exists for such a material that can be readily formed with a textured surface to improve the grip between the scale and a user's feet.

SUMMARY OF THE INVENTION

The present invention has been developed to fulfill the needs noted above, and therefore has as an object the provision of a bathroom scale having a rigid platform weighing surface constructed of relatively thin gauge sheet metal.

Another object of the invention is the provision of a bathroom scale having a weighing surface covered with a rigid mat which is permanently attached to the weighing surface, and incapable of curling and peeling away from the weighing surface.

Another object of the invention is the reduction or elimination of internal braces and supports for supporting a weighing surface or platform of a household or bathroom scale.

Yet another object of the invention is the provision of a rigid textured mat on the weighing surface or platform of a scale which can provide a high friction surface and also structurally reinforce the underlying sheet metal cover of the scale.

Still another object of the invention is the provision of a rigid foot rest or foot mat which overlies a scale cover and which can be molded as a rigid plastic panel or sheet having various colors, textures and patterns resembling natural materials such as marble, jade and stone.

Another object of the invention is the provision of a high strength molded plastic mat which is highly resistant to impact damage and avoids the need for adhesives.

These and other objects are met by the present invention which is directed to a bathroom or household scale having a weighing platform covered with one or more rigid plastic mats or panels. The mats are molded with mounting projections such as pegs which align with and are inserted within mounting holes formed in the weighing surface or platform portion of the scale cover. In this case, the scale cover can be fabricated from relatively thin gauge sheet metal, yet accommodate heavy loads due to the structural support provided by the relatively rigid plastic mats.

By pinning or otherwise mechanically clamping, bolting, screwing or otherwise affixing the plastic mats to the top surface of the scale platform, the mats cannot come loose or curl upwardly around their edges as is the case with conventional flexible rubber mats which are glued to the scale platform. Moreover, by layering the relatively rigid plastic mats on top of the sheet metal scale platform, the load bearing capacity and strength of the platform is significantly increased.

An important feature of the invention is the use of a plastic material known as fiber filled polyester thermoset plastic (FFP) to mold rigid, dimensionally stable scale mats for mounting to the platforms of household weigh scales. By using FFP, impact and cosmetic issues associated with other molded plastic materials are reduced or eliminated. For example, sturdy anchor posts for mounting the mats to the scale can be molded from FFP. These molded posts or pegs will not break off under rugged use, and unsightly depressions or similar sink holes typically formed over such posts can be eliminated through the use of FFP.

The superior mechanical properties of FFP include high strength represented by a flex modulus of over one million pounds per square inch. Moreover, FFP can be molded with various textures and colors that closely simulate the look, weight and feel of natural materials to an extent not presently feasible using conventional injection molded plastic, vinyl or rubber materials.

A particular advantage of using FFP to produce scale mats is the ability to closely replicate such "natural" materials as marble, granite, stone, brick, limestone and other hard materials.

The structural properties and rigidity of FFP strengthen and rigidify an underlying scale platform so as to promote accuracy and repeatability in weighing weights over 250 pounds. At these heavier weights, the rigidity of the scale platform becomes an important factor in scale accuracy.

In summary, the present invention is directed to a body weigh scale having a foot supporting platform mat that is formed of a polymeric, decorative material that is sufficiently rigid so that it may be produced relatively thin, and yet not significantly deflect under load. Moreover, the polymeric, decorative material provides an attractive surface after molding. To this end, the body weigh scale platform incorporates a fiber-filled, polyester thermosetting polymer material that has extremely low shrinkage rates so that the outer pattern and shape of the scale mat is not affected by the forming of very thin cross sections adjacent to thick cross-sections such as required for forming mounting members on the mat. The rigidity of the fiber-filled, polyester thermosetting polymer material provides sufficient structural support for operation of the thin foot support platform mat and without significant deflection of the material.

The body weigh scale foot support platform mat may be formed from a fiber-filled, polyester thermoset material using a variety of thermosetting polymer formation methods. As examples, the body weigh scale mat may be formed using compression, transfer, or stuffer injection molding. Injection molding may be performed using a reverse inverted temperature process, which involves cold barrel injecting into a hot mold.

By using the fiber-filled, polyester thermosetting polymer material, there is significant molding flexibility for the load-receiving platform mat of the body weigh scale. For example, mounting members such as pegs or posts may be formed integral with the load receiving platform mat for mounting the mat to the platform without weakening the structure or causing color distortion, surface sinks, visual level changes, or warpage.

The strength of the fiber-filled, polyester thermosetting polymer material permits the body weigh scale mat to have a profile that is thin and lightweight. Also, because the fiber-filled, polyester thermosetting polymer material has a low shrink rate, an aesthetically-pleasing decorative surface may be provided.

The aforementioned objects, features, and advantages of the invention will, in part, be pointed out with particularity, and will, in part, become clear from the following more detailed description of the invention taken in conjunction with the accompanying drawings, which form an integral part thereof.

BRIEF DESCRIPTION OF THE DRAWINGS

In the various views of the drawings, like reference numbers designate like or similar parts.

DETAILED DESCRIPTION OF THE PREFERRED EMBODIMENTS

Figures 1, 2:
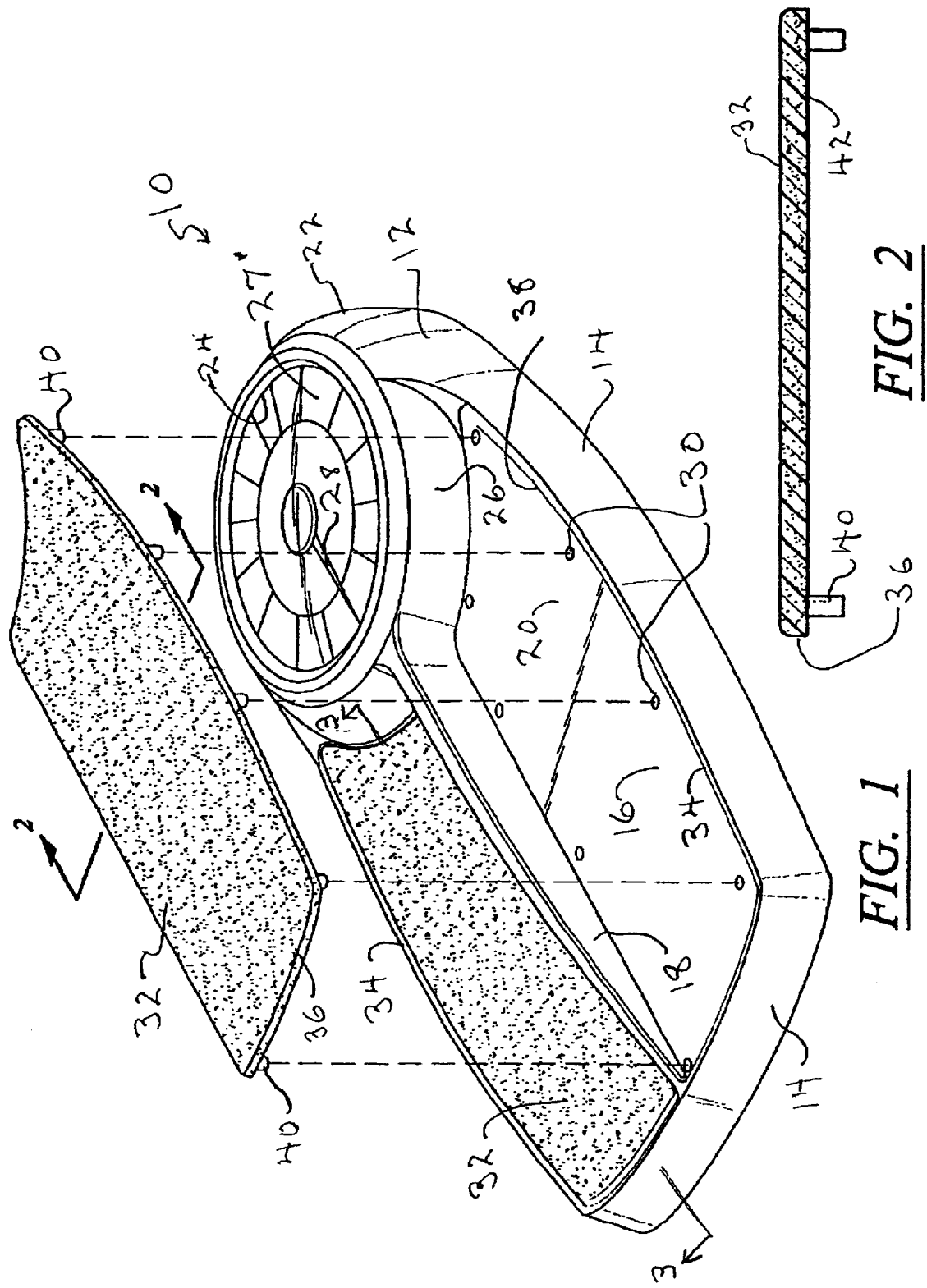
FIG. 1 is a partially exploded top perspective view of a scale constructed in accordance with the present invention.
FIG. 2 is a view in section taken through the mat of FIG. 1, along section line 2—2.

The present invention will now be described in conjunction with the drawings, beginning with FIG. 1 which shows a household or bathroom scale 10 constructed in accordance with the present invention. Scale 10 includes an upper cover 12 and a base (not shown) located beneath and within the cover. The base and cover are typically interconnected with coil springs in a known manner.

The cover 12 is advantageously formed as a sheet metal stamping having a peripheral side wall 14 and a substantially planar platform 16. A longitudinally-extending upstanding central rib 18 may be stamped upwardly from the platform 16 so as to divide the platform 16 into a pair of juxtaposed planar foot support portions 20.

The front end 22 of side wall 14 extends upwardly above platform 16 and defines part of a circular stamped opening 24. Rib 18 extends forwardly into a stamped raised wall 26 which extends upwardly from platform 16 and defines the remainder of stamped opening 24. A clear plastic dial cover 27 is mounted within the stamped opening 24 in a known fashion to protect dial indicator 28 from damage.

An important feature of the invention is the provision of mounting and alignment portions such as holes 30 provided within platform 16. Holes 30 can be formed during stamping of platform 16 or later punched, drilled, bored or otherwise formed through platform 16.

A peripheral ridge 34 may be stamped along the top edge of side wall 14 so as to rise slightly above the border of platform 16 and thereby provide peripheral support around the outer edges 36 of scale mats 32. Ridge 34, together with rib 18 and raised wall 26 define a pair of shallow recesses or pockets 38 for closely or snugly receiving a pair of mats 32. Of course, rib 18 can be omitted and a single mat 32 could be mounted on platform 16.

Scale mats 32 are advantageously formed of a rigid plastic material. A particularly preferred material is a fiber-filled plastic material such as fiber-filled polyester thermoset plastic (FFP). This material may be readily molded into flat structural sheets or panels in the shape of mats 32 shown in FIG. 1, or in any other shape desired for mats 32. That is, each load-receiving platform mat 32 is preferably formed from a fiber-filled, polyester thermosetting polymer material that is rigid, has a high modulus of elasticity and high tensile and compressive strength. In addition, the fiber-filled, polyester thermosetting polymer material exhibits a very low shrink rate, which permits it to maintain its shape after casting, and prevents discoloration of pigments in the material during the molding process. This combination of features permits the fiber-filled, polyester thermosetting polymer material to not only provide sufficient rigidity for strengthening the platform, but also to provide an attractive decorative finish that is free of color distortion, surface sinks, visual level changes, or warpage.

As one example, the fiber-filled, polyester thermosetting polymer material may be BMC 300 Granite provided by Bulk Molding Compounds, Inc. at 1600 Powis Court, West Chicago, Ill. 60185. The BMC 300 Granite is a polyester molding material that includes, inter alia, resin, catalysts, powdered mineral filler, reinforcing fiber (chopped strand), pigment, and lubricants. A variety of pigments may be provided, which provides flexibility in surface decoration.

BMC 300 Granite has a flexural strength of 10 to 23 thousand pounds per square inch, and a flexural modulus (modulus of elasticity) of 1.7 to 1.9 million pounds per square inch. The flexural strength, provided in part by the fibers in the material, is sufficient to permit manufacture of the load-receiving platform mat with narrow and thick portions, for example, the thin planar mat adjacent the thicker portions of the mounting members. Because the fiber-filled, polyester thermosetting polymer material is flexurally strong, the thin mat portions do not significantly deflect when a person is standing on the load-receiving platform. An additional benefit of the BMC 300 Granite is that it does not support a flame with a 5B rating at only 0.07 inches in thickness. Other fiber-filled, polyester thermosetting polymer materials may be used, such as are supplied by Industrial Dielectrics, Inc. of China.

The mold shrinkage rate for BMC 300 Granite is only 0.001 to 0.003 inches per inch. This low shrinkage rate permits the varied thickness load-receiving platform mat to be molded without perceptible color distortion, surface sinks, or visual level changes. Thus, the pattern provided by the pigments in the material is maintained over the surface of the load-receiving platform mat which maintains its shape after molding, providing an aesthetically-pleasing body weigh scale. In addition, the molding does not produce significant stresses in the final product, which avoids later warpage.

The low shrinkage rates of the fiber-filled, polyester thermosetting polymer material permits complex surface details to be incorporated into the platform mat without affecting the surface pattern of the platform mat. For example, the mounting members may be molded as part of the load-receiving platform mat, without adversely affecting the decorative pattern on the outer surface of platform mat, or the overall shape of the mat. These details may be added without grinding, polishing, or cutting, thereby saving significant labor costs. Not having to perform these machining operations also avoids the associated warpage over time.

In accordance with one aspect of the present invention, the load-receiving platform mat is formed via transform (or transfer) molding using an inverted temperature process, where the heated fiber-filled, polyester thermosetting polymer material is injected via a cold barrel into a hot mold. Alternatively, the load-receiving platform mat may be formed by compression molding the fiber-filled, polyester thermosetting polymer material. These processes, along with the low shrinkage rate of the fiber-filled, polyester thermosetting polymer material, avoid the deformation and creepage associated with the injection molding or die casting of most polymeric materials.

Again, a significant advantage of using FFP for constructing mats 32 is the exceptional strength and rigidity which is imported to the mats. This is particularly advantageous in the molding and formation of one or more mounting members 40 such as posts, projections or pegs on the underside 42 of each mat 32. The mounting members 40 may be shaped as short cylindrical projections which are molded homogeneously with the flat planar body portions of mats 32.

The mounting members 40 are shown in FIG. 2 as being located closely adjacent to the outer edges 36 of the scale mats 32. Mounting members 40 are spaced apart at predetermined positions so as to match and complement the positions and spacings of the mounting and alignment holes 30 formed in platform 16. That is, the pattern of the mounting members 40 matches the pattern of the mounting holes 30.

As further seen in FIG. 1, the scale platform mats 32 are quickly and easily mounted to the scale cover 12 by inserting or pressing the mounting members 40 into the mounting holes 30. This causes the mat or mats 32 to be snugly centered within pockets 38 and properly located on the cover 12.

Figure 3:
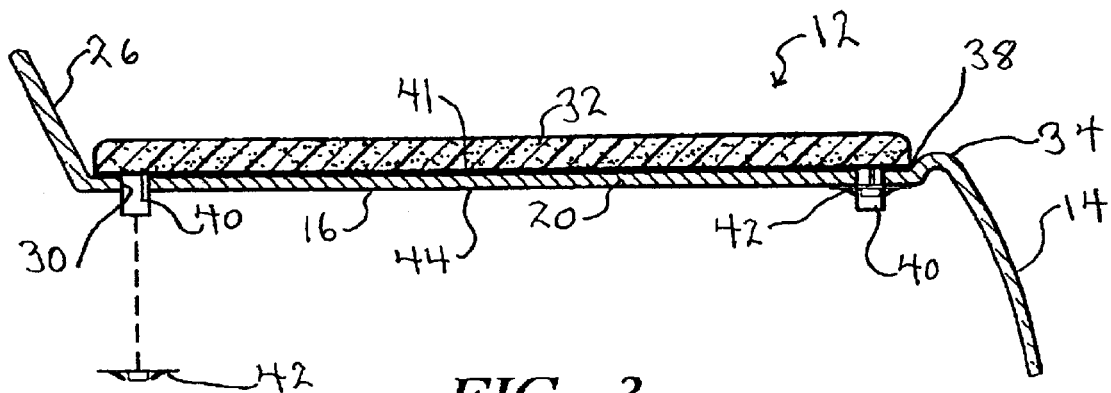
FIG. 3 is a partial longitudinal view in section taken through the scale of FIG. 1, along section line 3—3, showing one form of attachment of the mat to the platform.

As seen in FIG. 3, when the mounting members 40 are inserted through the mounting holes 30, the mounting members 40 project downwardly within the cover 12. The mats 32 are held tightly against the upper surfaces of the foot support portions 20 of the platform 16 by fasteners 42.

In FIG. 3, fasteners 42 take the form of self-locking mechanical spring nut fasteners which are pressed over the mounting members 40 and tightly abutted against the inner surface 44 of the foot support portions 20 of the platform 16. The mats 32 are tightly pulled against and abutted against the top platform 16 as the spring nuts are pushed snugly against the bottom of platform 16 to substantially unite and laminate the mat 32 and platform 16.

This lamination or layered assembly significantly strengthens and rigidifies the cover 12 so that additional structural support against the inner surface 44 of the foot support portions 20 is not required. This reduces parts and labor and reduces manufacturing costs.

The mats 32 may be molded in a variety of colors, textures and shapes to imitate more costlier materials such as marble, granite, brick, stone and the like. The upper surface 46 of the mats 32 may be provided with a somewhat grainy molded texture to imitate natural stone as well as to increase the frictional gripping capability of the mats.

Figure 4:
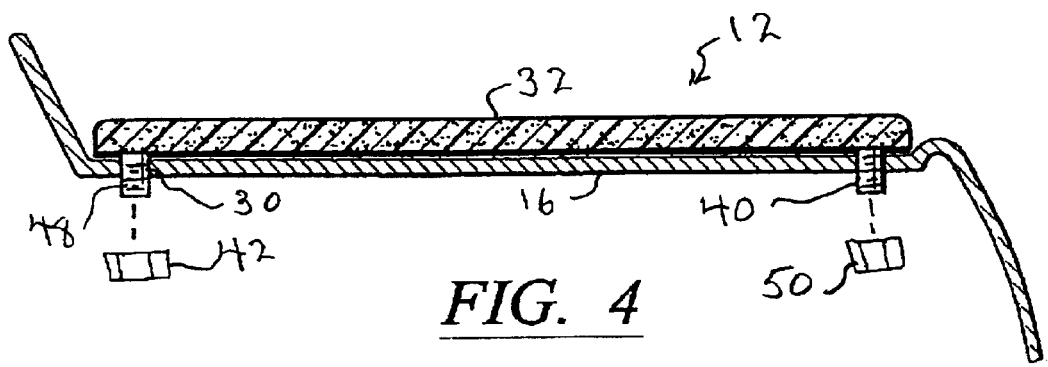
FIGS. 4 and 5 are views similar to FIG. 3, showing alternate forms of attachment of the mat to the platform.

As seen in FIG. 4, the mounting members 40 may be formed with screw threads 48 for receiving threaded nuts 50 which may be tightened and torqued against the underside of platform 16. Threads 48 may be formed homogeneously during molding of the mats 32 or later formed by machining.

Figure 5:
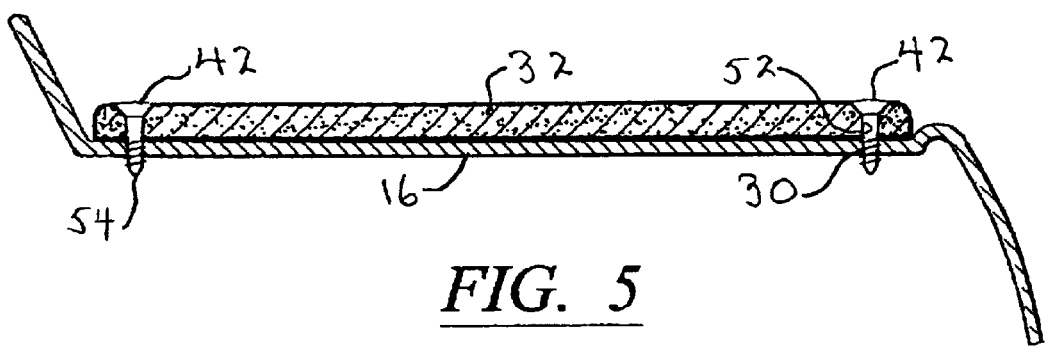

Another approach to mounting the mats 32 to the platform 16 is shown in FIG. 5 wherein countersunk holes 52 are formed through the mats 32 either during molding of the mats or later by machining. In the example of FIG. 5, the fasteners 42 are flat-headed self-tapping sheet metal screws which screw tightly into holes 30 formed in platform 16. The threaded ends 54 of the screws act in the same or similar fashion as the mounting members 40 in the prior examples, by locating and positioning the mats on the cover 12. The screws can also be applied from beneath platform 16 and threaded through holes 30 in the platform into holes 52 formed in the underside of mat 32. In this case, the threaded ends 54 would not extend above or completely through the mat.

It is also possible to form a bulbous or rounded head on the end of each mounting member 40 so that the mounting members can be resiliently snapped into and retained within the holes 30, without the need for additional fasteners 42.

The aforementioned objects, features, and advantages of the invention will, in part, be pointed out with particularity, and will, in part, become clear from the following more detailed description of the invention taken in conjunction with the accompanying drawings, which form an integral part thereof.

What is claimed is:

1. A scale mat, comprising:
    a generally rigid planar body portion formed of fiber filled polyester thermoset plastic; and
    at least one mounting member projecting from said planar body portion and formed of said plastic for mounting and mechanically biasing said mat to a scale.

2. The mat of claim 1, wherein said planar body portion comprises a molded sheet.

3. The mat of claim 1, wherein said mounting member comprises a peg.

4. A platform scale assembly, comprising:
    a scale cover; and
    a rigid scale mat mechanically biased and coupled to said scale cover, said mat comprising fiber filled polyester thermoset plastic held tightly against said scale cover so as to significantly increase load bearing capacity of said scale cover.

5. The assembly of claim 4, further comprising a mounting member formed of said plastic and rigidly mounting said mat to said scale cover.

6. The assembly of claim 5, wherein said mounting member comprises a projection extending from said mat.

7. The assembly of claim 6, wherein said cover has a recess formed therein and wherein said projection is positioned in said recess.

8. The assembly of claim 7, wherein said recess is formed as a hole extending through said cover and wherein said projection extends through said hole.

9. The assembly of claim 8, further comprising a mechanical fastener rigidly anchoring said mat to said cover.

10. The assembly of claim 4, wherein said cover is formed with a recessed pocket and wherein said mat is fixed within said pocket.

11. A platform scale assembly, comprising:

a sheet metal scale cover; and a rigid foot-supporting mat mechanically biased and fixed to said scale cover and structurally rigidifying said scale cover, said mat comprising a polymeric fiber-filled plastic material held tightly against said scale cover so as to significantly increase load bearing capacity of said scale cover.

12. The assembly of claim 11, wherein said plastic material comprises a polyester thermoset plastic material.

13. The assembly of claim 11, wherein said mat is tightly abutted against said scale cover so as to substantially unite and laminate said mat and said cover.

14. The assembly of claim 13, further comprising a mechanical fastener biased against said cover so as to pull said mat against said cover.

* * * * *